United States Patent [19]

Jacoby

[11] Patent Number: 4,515,084
[45] Date of Patent: May 7, 1985

[54] TRACK FOR DRIVERLESS VEHICLES
[75] Inventor: Charles E. Jacoby, Bethleham
[73] Assignee: SI Handling Systems, Inc., Easton, Pa.
[21] Appl. No.: 328,282
[22] Filed: Dec. 7, 1981
[51] Int. Cl.³ ............................................. B61B 13/12
[52] U.S. Cl. .................................... 104/166; 104/118; 104/124; 238/10 R
[58] Field of Search ............... 104/118, 124, 125, 165, 104/166, 69; 74/89, 25; 238/10 R; 198/346, 472

[56] References Cited

U.S. PATENT DOCUMENTS

| 402,933 | 5/1889 | Judson | 104/166 |
|---|---|---|---|
| 1,963,947 | 6/1934 | Adams | 198/346 |
| 2,523,829 | 9/1950 | Hubbell | 198/346 |
| 3,343,499 | 9/1967 | Burrows | 104/172 |
| 3,658,327 | 4/1972 | Thiede | 238/10 R X |
| 3,690,267 | 9/1972 | Sutton | 104/165 |
| 3,818,837 | 6/1974 | Jacoby et al. | 104/166 |
| 3,858,626 | 1/1975 | Ribordy | 104/166 |
| 3,861,322 | 1/1975 | Danly | 104/166 |
| 3,929,079 | 12/1975 | Eliassen | 104/172 B |
| 4,054,215 | 10/1977 | Kurahashi | 104/166 X |
| 4,246,846 | 1/1981 | Betschart | 104/69 |
| 4,313,383 | 2/1982 | Parazader | 104/124 |
| 4,375,194 | 3/1983 | Rohrbach | 104/166 |

FOREIGN PATENT DOCUMENTS

| 162308 | 12/1979 | Japan | 104/124 |
|---|---|---|---|
| 1111109 | 4/1968 | United Kingdom | 104/118 |

Primary Examiner—Randolph Reese
Attorney, Agent, or Firm—Seidel, Gonda & Goldhammer

[57] ABSTRACT

The track for driverless vehicles has a low profile with a rail extending along one side edge portion of the track structure and a drive shaft extending along the opposite side edge portion of the track structure. The drive shaft performs the dual function of supporting wheels on one side of a driverless vehicle and driving the vehicle by frictional contact with said wheels. The rail and the periphery of the drive shaft at the 12 o'clock position thereon are substantially the same elevation.

10 Claims, 5 Drawing Figures

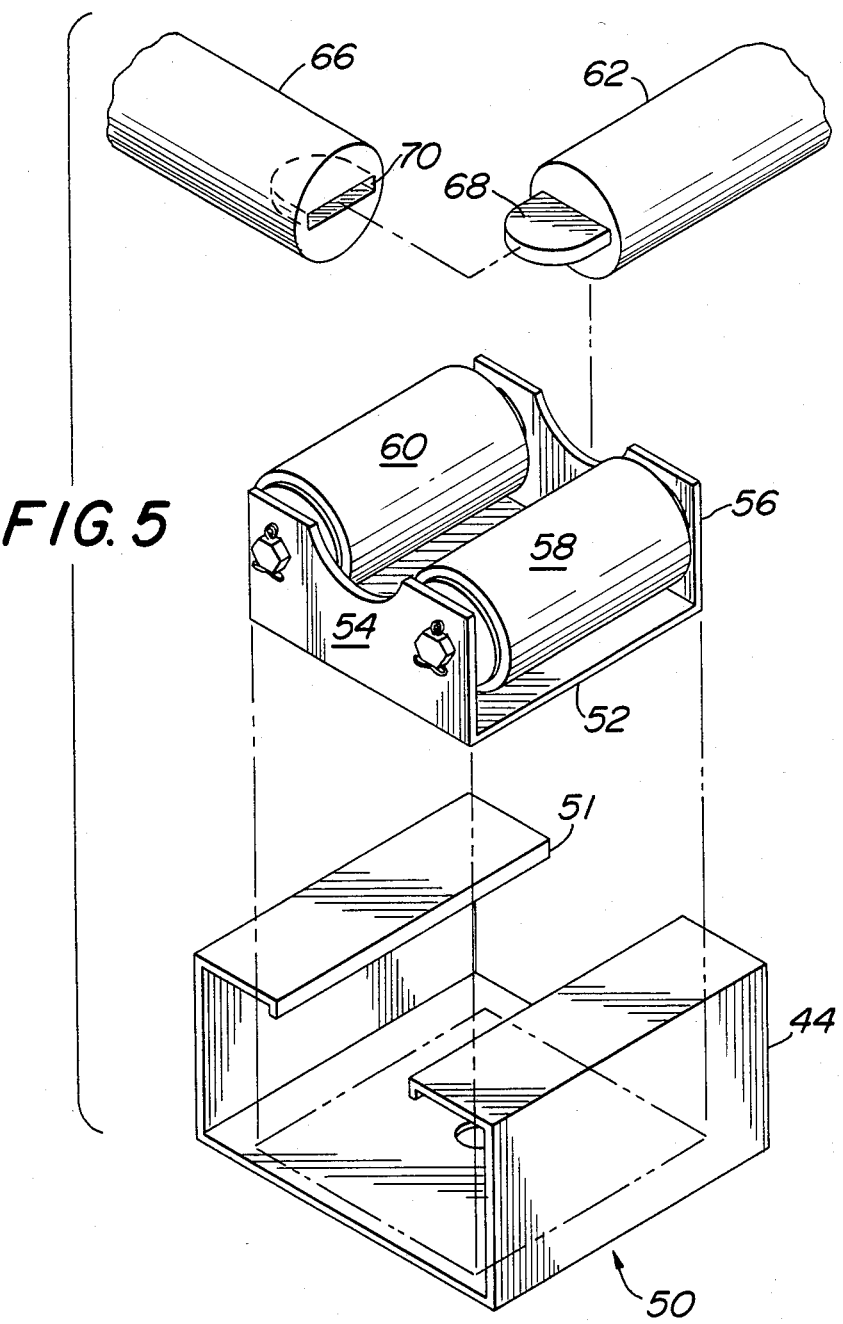

4,515,084

TRACK FOR DRIVERLESS VEHICLES

BACKGROUND

The present invention is directed to recognition of the need for and the solution of the problem of how to structurally interrelate the components of the track which will have a low profile, be inexpensive, be adapted to support at an elevation so that the knees of a person sitting on a chair may be underneath the track while eliminating one of the conventional rails on a track.

SUMMARY OF THE INVENTION

The present invention is directed to a track for driverless vehicles. The track includes an elongated low profile track structure having a rail on a top surface thereof along one side thereof for engaging support wheels of a driverless vehicle. The track structure includes an upright longitudinally extending guide surface for cooperation with guide means on a driverless vehicle. A drive shaft extends along the track structure adjacent the other side thereof and is parallel to said rail.

A motor means is connected to the drive shaft for rotating the drive shaft about its longitudinal axis. The periphery of the drive shaft at the 12 o'clock position is at substantially the same elevation as the top surface of said rail. Wheels on opposite sides of a driverless vehicle can be supported by one of said rail and drive shaft. The drive shaft is both a drive and a rail for a driverless vehicle.

It is an object of the present invention to provide a novel track for a driverless vehicle wherein the track is characterized by one or more of being lightweight, inexpensive, has a low profile, and has only one rail with the other rail being the drive shaft which drives the vehicle along the track.

It is another object of the present invention to provide a track for a driverless vehicle which has a low profile at an elevation so that the knees of a worker may be disposed beneath the track while sitting on a chair alongside the track for the purpose of working on material supported by driverless vehicles.

Other objects and advantages will appear hereinafter.

For the purpose of illustrating the invention, there is provided in the drawing a form which is presently preferred; it being understood, however, that this invention is not limited to the precise arrangements and instrumentalities shown.

FIG. 5 is an exploded view showing a bearing and a portion of the ends of two adjacent drive shafts.

DETAILED DESCRIPTION

Figure 1:
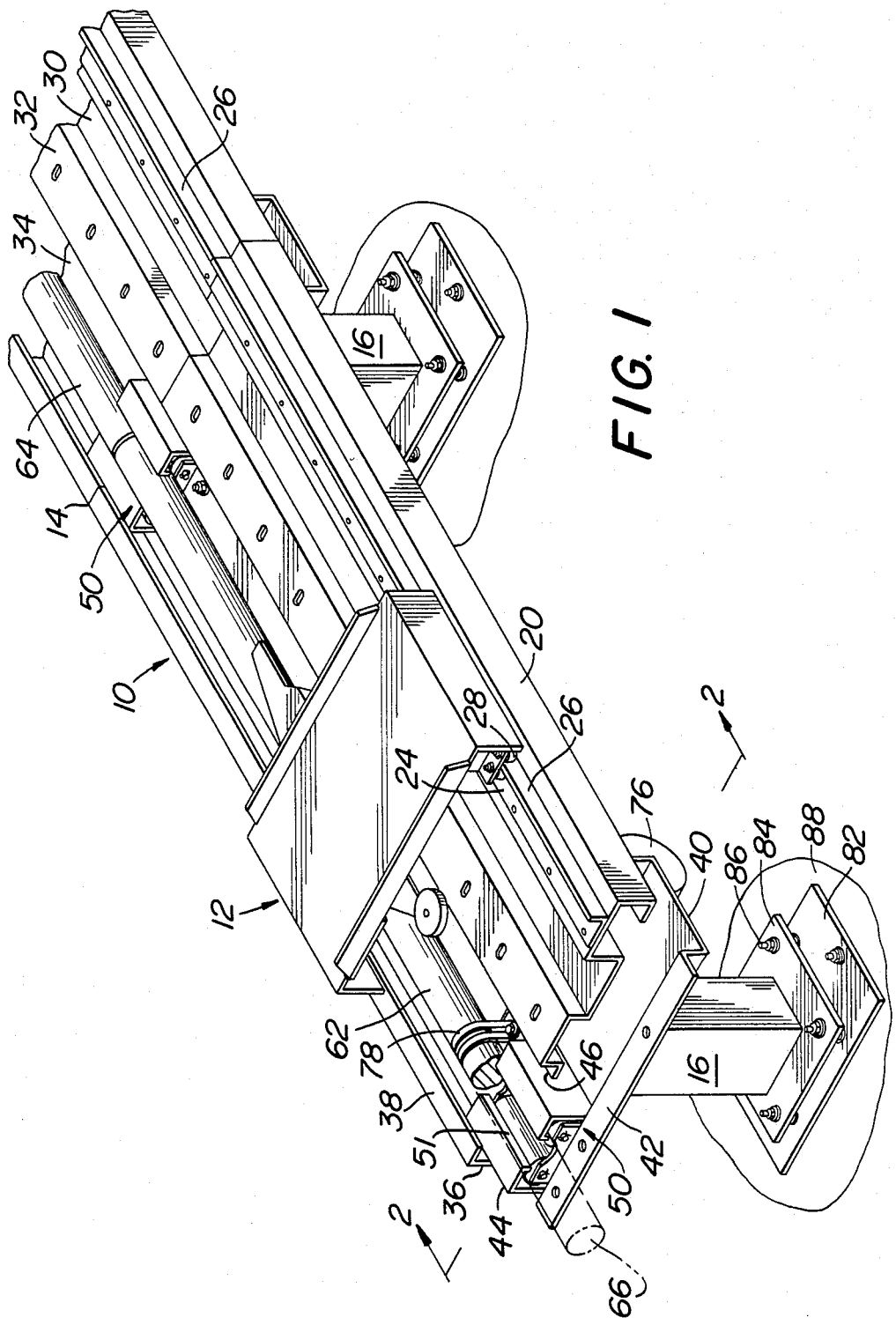
FIG. 1 is a partial perspective view of a portion of a track for driverless vehicles in accordance with the present invention.

Referring to the drawings in detail, wherein like numerals indicate like elements, there is shown in FIG. 1 a track designated generally as 10. The track 10 is preferably comprised of modules which may be coupled together to form an endless conveyor system for driverless vehicles 12. The joint between two modules of the track 10 is designated 14.

The track 10 is preferably supported by a pedestal 16 at each of the joints 14 with the adjacent end portions of track modules supported by each pedestal. The track 10 has a low profile as will be made clear hereinafter and is adapted to be supported by the pedestals 16 at a predetermined elevation so that a worker sitting on a chair may position his knees below the track 10. In this regard, a suitable dimension is about 63.5 centimeters from the floor surface to the bottom surface of the track 10.

Figure 2:
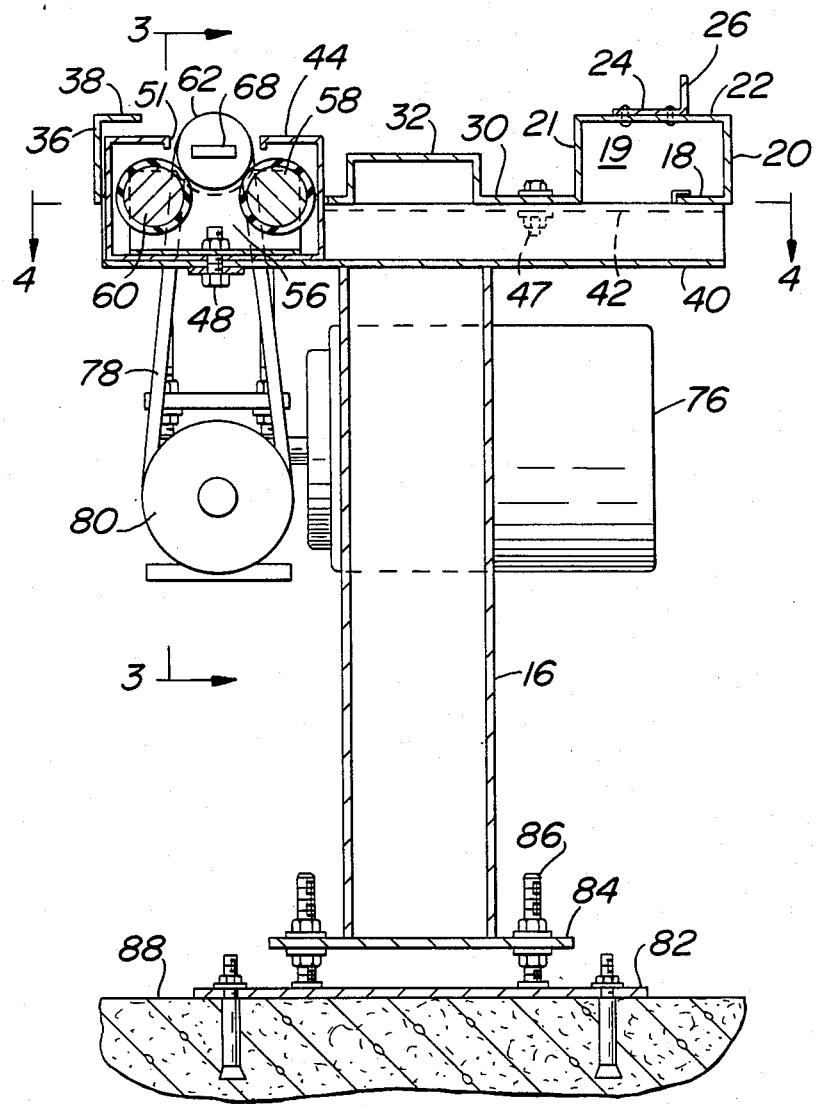
FIG. 2 is a sectional view taken along the line 2—2 in FIG. 1 but on an enlarged scale.
Figure 3:
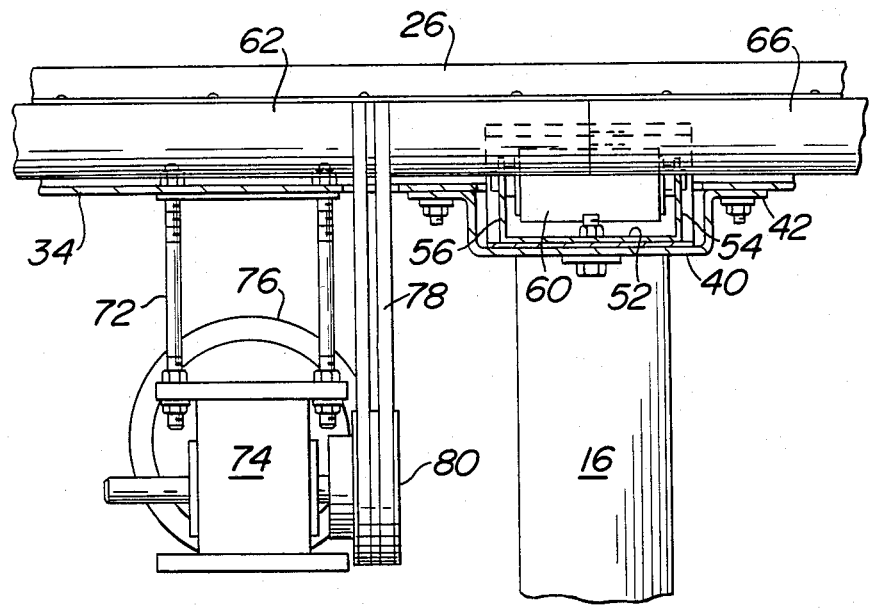
FIG. 3 is a sectional view taken along the line 3—3 in FIG. 2.

As shown more clearly in FIG. 2, the track 10 is of the pan type having a flange 18 extending inwardly from side wall 20. The bottom surface of flange 18 defines the bottom surface of the track 10. Side wall 20 is connected to a horizontally inwardly extending top wall 22. The height of wall 20 is approximately $2\frac{1}{4}$ inches. A rail 24 is secured to the top wall 22 and has an integral upstanding guide flange 26. Guide flange 26 is adapted to cooperate with a pair of guide rollers 28 at the front and rear ends of the vehicle 12. The guide flange 26 prevents the vehicle 12 from moving transversely of the track. Vehicle 12 has a pair of support wheels which ride on the rail 24. A wall 21 depends downwardly from the top wall 22 and is parallel to side wall 20 and continues inwardly as a depressed wall 30. Depressed wall 30 is at the same elevation as flange 18. Between adjacent pedestals 16, it is preferred to provide a plastic enclosure cooperating with the flange 18 and forming an extension thereof so as to define a wireway chamber 19.

An intermediate wall 32 is provided between the depressed wall 30 and a second depressed wall 34. See the righthand end of FIG. 1. Wall 32 is preferably provided with a plurality of slots at spaced points therealong so as to facilitate attachment of a traffic control device for controlling the speed of movement of vehicles 12 along the track. The speed control device is not shown in the drawings and anyone of a wide variety of conventional speed control devices may be used. Wall 34 merges into an upstanding side wall 36 which terminates in a horizontally inwardly extending top wall 38. Top wall 38 is at the same elevation as top wall 22. Walls 20 and 36 define the sides of the track 10.

Each pedestal 16 supports at its upper end a transversely disposed trough 40 having outwardly extending horizontal side flanges 42. See FIGS. 1 and 2. Within the trough 40 there is provided a bearing housing 44. To accomodate the bearing housing 44, the adjacent ends of the modules of the track 10 are provided with a notch 46. Each notch 46 receives one-half of the bearing housing 44. In the depressed wall 30, one or more bolts 47 joins an end portion of the section of track 10 to one of the flanges 42. A single bolt 48 couples the bearing housing 44 to the bottom of the trough 40. See FIG. 2.

Figure 4:
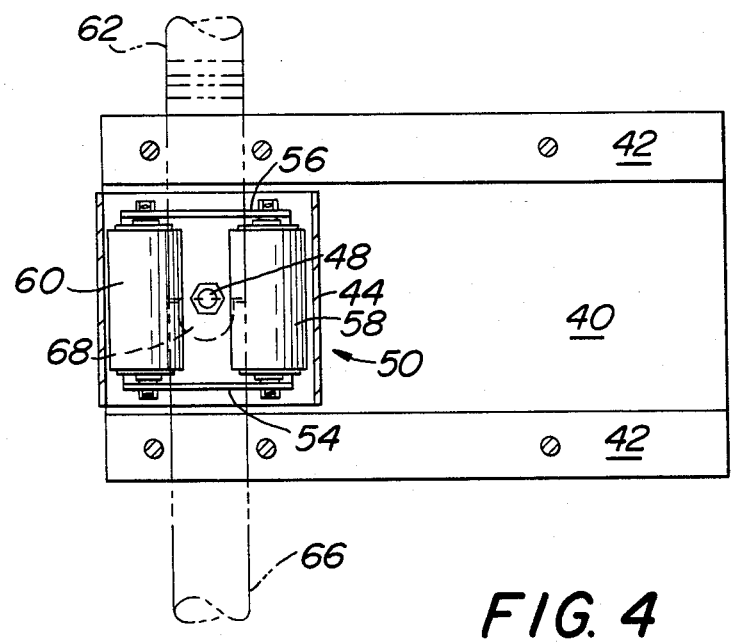
FIG. 4 is a sectional view taken along the line 4—4 in FIG. 2.

Referring to FIGS. 4 and 5, the bearing housing 44 is part of a bearing assembly 50. Housing 44 is open at its opposite ends and has a slot 51 in a top wall thereof. Within the housing 44 there is provided a base 52 having upstanding flanges 54, 56. Spaced roller bearings 58, 60 are supported by the flanges 54, 56. Bearings 58, 60 are preferably made from the material such as urethane. By way of example, the bearings are cylinders preferably having a diameter of about 5 centimeters, a length of about 7.5 centimeters, with the axes spaced apart by a distance of approximately 7 centimeters. As shown more clearly in FIG. 2, a substantial portion of each of the bearings 58, 60 is exposed when viewed from above through the slot 51.

The depressed wall 34 supports a drive shaft 62 whose length preferably equals the length of its track module. Each end of the drive shaft 62 overlies one-half of the bearings in the bearing assemblies 50. See one such bearing assembly and the partial overlap of the bearings as shown in FIG. 4. As shown in FIG. 2, the drive shaft 62 is partially disposed in the slot 51 so that it may be supported by each of the bearings 58, 60. Another drive shaft 64 on the adjacent module is aligned with the drive shaft 62 and coupled thereto as shown in the righthand end of FIG. 1 by way of the bearings in the bearing assemblies 50. Another drive shaft 66 on an adjacent module is aligned with the drive shaft 62 as shown at the lefthand end of FIGS. 1, 4 and 5. Drive shaft 66 overlies one-half of the bearings 58, 60. Thus, the end portions of aligned drive shafts are supported by bearings which will transmit rotary motion from one drive shaft to another. The drive shafts need not be supported in any other manner except by the bearings but may have a thrust collar at any convenient location therealong.

Since the drive shafts are supported from below by the bearings 58, 60 at each bearing assembly 50, there is a tendency during start-up for the drive shafts to climb up out of the slot 51. To prevent such action, it is preferred to provide a key 68 on the end of shaft 62. Key 68 is adapted to be received in a mating slot 70 on the adjacent drive shaft 66. See FIG. 5. The key 68 performs no useful function during operation of the system but acts as an optional precautionary device during start-up.

A plurality, preferably four, of rods 72 are bolted at their upper ends to the depressed wall 34 adjacent one end of the module. A speed reducer 74 is supported by a bracket connected to the rods 72. The output pulley 80 from the speed reducer 74 is coupled by way of belts 78 to the drive shaft 62 for rotating drive shaft 62 about its longitudinal axis. A motor 76 is coupled to the speed reducer 74. Electrical wiring for the motor 74 is conveniently arranged within the wireway chamber 19.

A floor plate 82 is fixedly secured to the floor 88 in any convenient manner. See FIG. 2. Each pedestal 16 has a bottom plate 84. Upstanding bolts 86 secured to the plate 82 extend through holes in the plate 84 with nuts above and below the plate 84 to facilitate leveling. The preferred height from floor 88 to the bottom surface on flange 18 is preferably 63.5 centimeters.

The track 10 is preferably made from sheet metal such as 12–16 gauge carbon steel bent into the configuration illustrated in the drawings so as to have a low profile. Tracks made in this manner are easy to manufacture, occupy minimum space for purposes of shipment, and are easy to install onto the pedestals 16 at the location of erection. Further, the track may easily be relocated at future dates as production requirements change. If a module is damaged, it is easy to replace.

Since each bearing assembly is bolted to the trough 40 with only a single belt 48, the bearings will be self accomodating to the drive shafts. The drive shafts 62, 64, 66, etc. are preferably solid shafts having a diameter corresponding to the diameter of the bearings 58, 60. By using solid drive shafts, their weight is substantial so that they will remain in position and will enable the drive shafts to perform the additional function of supporting one-half of the load on the vehicles 12. Thus, the drive shafts act as a rail on one side of the track 10 for cooperation with the rail 24 on the other side of the track 10. The 12 o'clock position on the periphery of the drive shafts is at substantially the same elevation as the top surface of rail 24. Vehicle 12 preferably has drive wheels along one side thereof for frictional contact with the drive shafts 62, 64, 66, etc.

The present invention may be embodied in other specific forms without departing from the spirit or essential attributes thereof and, accordingly, reference should be made to the appended claims, rather than to the foregoing specifications, as indicating the scope of the invention.

I claim:

1. A track for a driverless vehicle comprising a horizontally disposed integral sheet metal track structure having a low profile and shaped to have first and second rails on a top surface thereof along opposite sides thereof for supporting a driverless vehicle disposed entirely above said track structure, said track structure being a plurality of sheet metal members arranged end to end, said first rail being a discrete longitudinally extending drive shaft supported by cylindrical bearings on said track structure and adapted for frictional contact with a drive wheel on one side of a driverless vehicle, said second rail being a horizontally disposed surface which is an integral portion of said track structure and adapted to be in rolling contact with a support wheel on the other side of a driverless vehicle, motor means supported by said track structure and connected to said shaft for rotating said shaft about its longitudinal axis, the top surface of said second rail lying in a generally horizontal plane which is tangent to said shaft at the 12 o'clock position thereof, and said shaft being both a drive and a rail for a driverless vehicle.

2. A track in accordance with claim 1 including a pair of bearing assemblies each having a pair of said cylindrical bearings in partial contact with a bottom quadrant of each end of the drive shaft.

3. A track in accordance with claim 2 including track support means which includes a sheet metal trough transversely disposed with respect to the track structure and having horizontally disposed flanges, said track structure including track sections, adjacent track sections partially overlapping each trough, each track section being bolted to one of said flanges, one of said bearing assemblies being between said trough flanges.

4. A track in accordance with claim 1 wherein said track structure has top walls along opposite sides thereof one of which is said rail, means on said track structure for supporting a traffic control device including a horizontally disposed intermediate wall in a central portion of the track structure between said rails, said intermediate wall being below the elevation of said top walls and above the elevation of portions of the track structure immediately adjacent thereto, said means on said intermediate wall including a plurality of holes therein at spaced locations therealong.

5. A track in accordance with claim 1 wherein said drive shaft is solid and has means at its ends for coupling the same to another drive shaft aligned therewith.

6. A track for a driverless vehicle comprising an elongated track structure made from a plurality of sheet metal members arranged end to end, the width of said members defining the width of said track structure, said track structure having a rail on a top surface thereof along one side thereof for engaging support wheels of a driverless vehicle, an upright longitudinally extending guide surface on the track structure for cooperation with guide means on a driverless vehicle, a plurality of drive shafts arranged end to end and extending along the track structure adjacent the other side thereof and parallel to said rail, motor means coupled to at least one of said drive shafts for rotating the same about its longitudinal axis, said one drive shaft being coupled to an adjacent drive shaft, means below said ends of the metal members for supporting said track structure from a floor, the periphery of said drive shafts at the 12 o'clock position being at substantially the same elevation as the top surface of said rail so that the wheels on opposite sides of a driverless vehicle will be supported by one of said rail and drive shafts, whereby the drive shafts constitute both a drive and a rail for a driverless vehicle.

7. A track in accordance in claim 6 wherein said track support means includes a vertically disposed discrete pedestal adjacent each end of the track members, each end portion of adjacent track members partially overlapping a pedestal.

8. A track in accordance with claim 7 wherein each pedestal supports a pair of cylindrical bearings parallel to and beneath the elevation of the drive shafts, each end portion of the drive shafts being rotatably supported by partially overlapping a pair of bearings.

9. A track in accordance with claim 8 including a housing for said bearings, said bearing housing having a slot in the top wall thereof, the ends of adjacent drive shafts being partially disposed within said slot.

10. A track for a driverless vehicle comprising:
(a) an elongated track structure made from sheet metal and having a low profile, said track structure having a rail on a top surface thereof along one side thereof for engaging support wheels of a driverless vehicle, an upright longitudinally extending guide surface on the track structure for cooperation with guide means on a driverless vehicle, a horizontally disposed intermediate wall in a central portion of the track, said intermediate wall being below the elevation of said rail and above the elevation of portions of the track immediately adjacent thereto, said intermediate wall having means at predetermined locations thereon to facilitate securing a traffic control device thereto;
(b) a drive shaft extending along the track structure adjacent the other side thereof and parallel to said rail, the periphery of said drive shaft at the 12 o'clock position being at substantially the same elevation as the top surface of said rail so that the wheels on opposite sides of the driverless vehicle will be supported by one of said rail and drive shaft, whereby said drive shaft is both a drive and a rail for a driverless vehicle, motor means coupled to said drive shaft for rotating said drive shaft about its longitudinal axis; and
(c) means below said track structure for supporting said track structure such that the bottom surface of the track will be spaced from a floor therebelow, said support means including a plurality of troughs transversely disposed with respect to the track and having horizontally disposed flanges, said track including sections, each track section being bolted to one of said flanges, each trough including a pair of cylindrical bearings parallel to and beneath the elevation of the driveshaft, each end portion of the drive shaft being rotatably supported by partially overlapping a pair of said bearings.

* * * * *